United States Patent
Kamata et al.

(10) Patent No.: US 9,391,476 B2
(45) Date of Patent: Jul. 12, 2016

(54) POWER FEEDING DEVICE, WIRELESS POWER FEEDING SYSTEM USING THE SAME AND WIRELESS POWER FEEDING METHOD

(75) Inventors: Koichiro Kamata, Kanagawa (JP); Misako Sato, Kanagawa (JP); Shuhei Maeda, Tokyo (JP)

(73) Assignee: Semiconductor Energy Laboratory Co., LTD., Kanagawa-ken (JP)

( * ) Notice: Subject to any disclaimer, the term of this patent is extended or adjusted under 35 U.S.C. 154(b) by 833 days.

(21) Appl. No.: 13/214,458

(22) Filed: Aug. 22, 2011

(65) Prior Publication Data

US 2012/0062039 A1    Mar. 15, 2012

(30) Foreign Application Priority Data

Sep. 9, 2010   (JP) .................................. 2010-202173

(51) Int. Cl.
| | |
|---|---|
| H01F 38/00 | (2006.01) |
| H02J 17/00 | (2006.01) |
| H04B 1/44 | (2006.01) |
| H02J 5/00 | (2016.01) |

(52) U.S. Cl.
CPC ................. H02J 17/00 (2013.01); H02J 5/005 (2013.01); H04B 1/44 (2013.01)

(58) Field of Classification Search
CPC ........... H02J 5/005; H02J 7/025; H02J 17/00; H01F 38/14; B60L 11/182; H04B 1/44; H04B 1/38
USPC ........ 307/104, 9.1, 82, 84; 455/41.2, 39, 133, 455/83
See application file for complete search history.

(56) References Cited

U.S. PATENT DOCUMENTS

| | | |
|---|---|---|
| 5,124,699 A | 6/1992 | Tervoert et al. |
| 5,428,521 A | 6/1995 | Kigawa et al. |
| 5,790,946 A | 8/1998 | Rotzoll |
| 6,509,217 B1 | 1/2003 | Reddy |
| 6,737,302 B2 | 5/2004 | Arao |
| 6,837,438 B1 | 1/2005 | Takasugi et al. |

(Continued)

FOREIGN PATENT DOCUMENTS

| | | |
|---|---|---|
| CN | 101630773 A | 1/2010 |
| CN | 102027688 A | 4/2011 |

(Continued)

OTHER PUBLICATIONS

Kurs A et al., "Wireless Power Transfer via Strongly Coupled Magnetic Resonances", Science, Jul. 6, 2007, vol. 317, No. 5834, pp. 83-86.

(Continued)

*Primary Examiner* — Rexford Barnie
*Assistant Examiner* — Jagdeep Dhillon
(74) *Attorney, Agent, or Firm* — Nixon Peabody LLP; Jeffrey L. Costellia

(57) ABSTRACT

An object is to provide a power feeding device, a power feeding system, and a power feeding method which are more convenient for a power feeding user at the power receiving end. The power feeding device includes a means of controlling a frequency of a power signal transmitted to a power receiver, based on a proportion of signals, among power signals output to an antenna circuit, that return from the power receiver to the antenna circuit without feeding power to the power receiver.

31 Claims, 11 Drawing Sheets

(56) References Cited

U.S. PATENT DOCUMENTS

| | | |
|---|---|---|
| 7,180,421 B2 | 2/2007 | Pahlaven et al. |
| 7,209,771 B2 | 4/2007 | Twitchell, Jr. |
| 7,301,830 B2 | 11/2007 | Takahashi et al. |
| 7,394,382 B2 | 7/2008 | Nitzan et al. |
| 7,663,447 B2 | 2/2010 | Matsuzaki |
| 7,907,902 B2 | 3/2011 | Kato et al. |
| 8,154,460 B2 | 4/2012 | Sakata et al. |
| 8,334,619 B2 | 12/2012 | Takei |
| 8,339,096 B2 | 12/2012 | Osada |
| 8,439,270 B2 | 5/2013 | Nishijima |
| 8,487,478 B2 | 7/2013 | Kirby et al. |
| 8,600,299 B2 * | 12/2013 | Randall ............... A61B 8/4483 128/916 |
| 8,611,815 B2 | 12/2013 | Mohammadian et al. |
| 8,629,650 B2 | 1/2014 | Mohammadian et al. |
| 8,854,224 B2 | 10/2014 | Kirby et al. |
| 8,878,393 B2 | 11/2014 | Kirby et al. |
| 8,892,035 B2 | 11/2014 | Mohammadian et al. |
| 8,965,461 B2 | 2/2015 | Toncich et al. |
| 8,977,203 B2 | 3/2015 | Kato et al. |
| 2002/0049714 A1 | 4/2002 | Yamazaki et al. |
| 2003/0017804 A1 | 1/2003 | Heinrich et al. |
| 2003/0104848 A1 | 6/2003 | Brideglall |
| 2004/0077383 A1 | 4/2004 | Lappetelainen et al. |
| 2004/0127178 A1 * | 7/2004 | Kuffner ............... H01P 1/15 455/133 |
| 2004/0128246 A1 | 7/2004 | Takayama et al. |
| 2004/0131897 A1 | 7/2004 | Jenson et al. |
| 2004/0145454 A1 | 7/2004 | Powell et al. |
| 2005/0020321 A1 | 1/2005 | Rotzoll |
| 2005/0215119 A1 | 9/2005 | Kaneko |
| 2005/0254183 A1 | 11/2005 | Ishida et al. |
| 2006/0009251 A1 | 1/2006 | Noda et al. |
| 2007/0216348 A1 | 9/2007 | Shionoiri et al. |
| 2007/0229228 A1 | 10/2007 | Yamazaki et al. |
| 2007/0229271 A1 | 10/2007 | Shionoiri et al. |
| 2007/0229279 A1 | 10/2007 | Yamazaki et al. |
| 2007/0229281 A1 | 10/2007 | Shionoiri et al. |
| 2007/0278998 A1 | 12/2007 | Koyama |
| 2007/0285246 A1 | 12/2007 | Koyama |
| 2009/0284082 A1 | 11/2009 | Mohammadian |
| 2009/0284220 A1 | 11/2009 | Toncich et al. |
| 2009/0284227 A1 | 11/2009 | Mohammadian et al. |
| 2009/0284369 A1 | 11/2009 | Toncich et al. |
| 2009/0286475 A1 | 11/2009 | Toncich et al. |
| 2009/0308933 A1 | 12/2009 | Osada |
| 2010/0201201 A1 | 8/2010 | Mobarhan et al. |
| 2010/0201202 A1 | 8/2010 | Kirby et al. |
| 2010/0201311 A1 | 8/2010 | Lyell Kirby et al. |
| 2010/0201312 A1 | 8/2010 | Kirby et al. |
| 2010/0289341 A1 | 11/2010 | Ozaki et al. |
| 2010/0289449 A1 | 11/2010 | Elo |
| 2011/0080053 A1 | 4/2011 | Urano |
| 2011/0095618 A1 * | 4/2011 | Schatz ............... H03H 7/40 307/104 |
| 2011/0095619 A1 | 4/2011 | Urano |
| 2011/0101791 A1 | 5/2011 | Urano |
| 2012/0001493 A1 | 1/2012 | Kudo et al. |
| 2012/0025611 A1 | 2/2012 | Kamata et al. |
| 2012/0025627 A1 | 2/2012 | Shionoiri et al. |
| 2012/0025631 A1 | 2/2012 | Shionoiri et al. |
| 2013/0147428 A1 | 6/2013 | Kirby et al. |
| 2013/0147429 A1 | 6/2013 | Kirby et al. |
| 2013/0240877 A1 | 9/2013 | Nishijima |
| 2013/0300358 A1 | 11/2013 | Kirby et al. |
| 2015/0171636 A1 | 6/2015 | Toncich et al. |
| 2015/0188311 A1 | 7/2015 | Kato et al. |

FOREIGN PATENT DOCUMENTS

| | | |
|---|---|---|
| JP | 2008-154222 A | 7/2008 |
| JP | 2010-022076 A | 1/2010 |
| JP | 2010-119246 | 5/2010 |
| JP | 2011-200045 A | 10/2011 |
| JP | 2012-016171 A | 1/2012 |
| WO | WO-2010/036980 | 4/2010 |
| WO | WO-2010/050008 | 5/2010 |
| WO | WO 2010/055381 A1 | 5/2010 |

OTHER PUBLICATIONS

Kurs.A et al., "Wireless Power Transfer via Strongly Coupled Magnetic Resonances", Science, Jul. 6, 2007, vol. 317, No. 5834, pp. 83-86.

Chinese Office Action (Application No. 201110293657.X) Dated Oct. 29, 2014.

* cited by examiner

POWER FEEDING DEVICE, WIRELESS POWER FEEDING SYSTEM USING THE SAME AND WIRELESS POWER FEEDING METHOD

BACKGROUND OF THE INVENTION

1. Field of the Invention

The present invention relates to a power feeding device, a wireless power feeding system, and a wireless power feeding method.

2. Description of the Related Art

In recent years, electronic devices using electric power as a driving power, which are typified by mobile devices such as mobile phones or laptop personal computers, are often used while being carried.

Also, transportation means such as bicycles and automobiles using electric power as a driving power have been developed from the point of view of environmental cleanness and safety.

It is difficult to constantly supply power to electronic devices and transportation means that are used outdoors or while traveling, by a wire from a commercial power supply distributed to each house. Therefore, mobile electronic devices and transportation means are provided with batteries that are charged from a commercial power supply in advance, and are operated by supplying power from the batteries.

Since operation time of the electronic device is limited by the amount of stored power in the battery, a user needs to prepare a spare battery or find a commercial power supply from which the battery can be recharged outside the house, in order to use the electronic device continuously for a long time.

Accordingly, a contactless power feeding system has been proposed so that power can be fed to a battery even if a commercial power supply is not available, and a more efficient power feeding system that takes into consideration issues of obstacles has been studied (see Patent Document 1, for example).

REFERENCE

[Patent Document 1] Japanese Published Patent Application No. 2010-119246

SUMMARY OF THE INVENTION

However, because contactless power feeding devices and power feeding systems operate without contact, there are problems in that they have difficulty specifying or managing a power feeding user who is to receive power (at the power receiving end), controlling the amount of power that is supplied to a power receiver, and the like.

Therefore, an object is to provide a power feeding device, a wireless power feeding system, and a power feeding method which are more convenient for a power feeding user at the power receiving end.

An object is to provide a power feeding device, a power feeding system, and a power feeding method which also allows a power feeding provider (a company) on the power feeding side (power transmitting side) to supply power without waste.

An object is to provide a power feeding device, a power feeding system, and a power feeding method by which an efficient power feeding service is possible for both the user and the provider, by specifying and managing the power feeding user on the power receiving end and properly controlling the amount of power supplied to a power receiver.

In wireless power feeding performed between a power feeding device and a power receiver, the power feeding device has a means for controlling a frequency of a power signal (also called a "power signal of power transmission") that is transmitted to the power receiver, based on a proportion (hereinafter referred to as a "reflection coefficient") of signals, among power signals that are output to an antenna circuit, that return (that are reflected) from the power receiver to the antenna circuit without feeding power to the power receiver. That is, the power feeding device has a means for controlling the frequency of power signals (power signals of power transmission) that are transmitted to the power receiver so that the reflection coefficient of the power signals is at a predetermined value (hereinafter referred to as a "standard reflection coefficient") or less, or at a minimum. Note that the standard reflection coefficient is, for example, less than or equal to 0.6, preferably less than or equal to 0.4, or more preferably less than or equal to 0.2.

A means for wireless power feeding disclosed in this specification will be briefly described below. One example of wireless power feeding is a power feeding method using an antenna. With a certain antenna shape, the transmission efficiency of power that is fed from a power feeding device to a power receiver depends on the frequency of a power signal to be transmitted, the distance between the power feeding device and the power receiver, the resonant frequency that is specific to the power receiver, or the like.

Note that in this specification, the distance between the power feeding device and the power receiver is the shortest distance between an antenna provided for the power feeding device and an antenna of the power receiver.

If the frequency of the power signal to be transmitted is fixed to a given value $f_0$, the transmission efficiency of power that is fed from the power feeding device to the power receiver reaches the maximum value when the distance between the power feeding device and the power receiver is $d_{MAX}(0)$.

Also, the distance $d_{MAX}$ with which the transmission efficiency of a power signal that is fed from the power feeding device to the power receiver reaches the maximum value varies with the frequency f of the power signal to be transmitted, and each frequency f of a power signal has its specific distance $d_{MAX}$.

Accordingly, if the distance between the power feeding device and the power receiver is fixed to a given value $d_0$, the frequency $f_{MAX}(0)$ of the power signal to be transmitted, with which the transmission efficiency of the power signal that is fed from the power feeding device to the power receiver reaches the maximum value, can be determined.

In this specification, a resonant frequency is defined as $f_{MAX(a)}$ at which the transmission efficiency of a power signal reaches the maximum value, with a distance $d_a$ between the power feeding device and the power receiver.

Depending on the distance between the power feeding device and the power receiver, (in the case that the distance is particularly short) the above-mentioned resonant frequency is detected as two different resonant frequencies.

Here, the transmission efficiency of the power signal has a close relationship with the reflection coefficient, and the higher the transmission efficiency of a frequency of a power signal, the smaller the reflection coefficient thereof compared to a power signal of another frequency, and the reflection coefficient of the power signal of the resonant frequency $f_{MAX(a)}$, with which the transmission efficiency reaches the maximum value, reaches the minimum value compared to the power signal of the other frequency. One example of characteristics of the present invention is that it focuses on the relationship between the transmission efficiency and the reflection coefficient, and a power feeding device has a function of controlling the value of frequency f of a power signal to be transmitted, so that the transmission efficiency is at a predetermined value (hereinafter referred to as a "standard transmission efficiency") or higher, or at a maximum. Note that it is not necessary for the power receiver to have a function of controlling the value of frequency f of a power signal to be transmitted.

In this manner, the power feeding device can supply power to the power receiver without waste by transmitting a power signal to the power receiver at an optimum frequency for high power transmission efficiency.

One embodiment of a power feeding device and a power feeding system disclosed in this specification is as follows.

A power feeding device includes a transmission/reception circuit portion for a power feeding device that transmits and receives an electromagnetic wave, a signal processing circuit portion for a power feeding device that processes a power signal of an electromagnetic wave that is transmitted and received by the transmission/reception circuit portion for a power feeding device, and a power supply portion that supplies power to be transmitted to a power receiver.

The transmission/reception circuit portion for a power feeding device includes an antenna circuit, a rectifier circuit, a mixer, a demodulation circuit, a first oscillation circuit, and a control means.

The mixer mixes a first power signal generated by the first oscillation circuit and a second power signal generated by the control means and outputs a resulting signal to the antenna circuit.

The control means includes a coupler, a determination circuit, a second oscillation circuit, and a third oscillation circuit. An output of the second oscillation circuit or the third oscillation circuit becomes a second power signal.

The coupler detects a signal which is reflected from a power receiver and received by the antenna circuit.

The determination circuit calculates a reflection coefficient from the signal detected by the coupler, and outputs a determination result of whether or not the reflection coefficient obtained from the calculation is less than or equal to a standard reflection coefficient or detects (peak detection) a frequency of a power signal with the smallest reflection coefficient and outputs information of a frequency of the power signal. Note that information of this frequency corresponds to an absolute value of a difference between a frequency of a power signal that is the minimum reflection coefficient and a frequency of a power signal (hereinafter also referred to as a "base carrier") output from the first oscillation circuit. Also, the frequency of the power signal that is the minimum reflection coefficient is the resonant frequency $f_{MAX(a)}$, and it can be expressed as $f_b \pm \Delta f_\alpha$ when a frequency of the base carrier is $f_b$. Here, information of a frequency output from the determination circuit corresponds to $\Delta f_\alpha$. $\Delta f_\alpha$ is also called a frequency of a conversion carrier. Furthermore, the first oscillation circuit is also called a base carrier oscillation circuit.

The second oscillation circuit outputs a power signal with a frequency that changes continuously with time, and the third oscillation circuit outputs a power signal with one specified frequency.

When a determination result is input from the determination circuit and a reflection coefficient is less than or equal to the standard reflection coefficient, the second oscillation circuit stops output, the third oscillation circuit maintains output, and the second power signal becomes an output of the third oscillation circuit. Here, the third oscillation circuit maintaining output means that the output of the third oscillation circuit is maintained when a reflection coefficient that is less than or equal to the standard reflection coefficient is calculated. Note that when the reflection coefficient is less than or equal to the standard reflection coefficient when there is no output from the third oscillation circuit, the second power signal is stopped.

When a determination result is input from the determination circuit and the reflection coefficient is larger than the standard reflection coefficient, output from the third oscillation circuit is stopped, and an output of the second oscillation circuit is output as the second power signal. The second oscillation circuit is also called a continuous frequency oscillation circuit.

When information ($\Delta f_\alpha$) of a frequency of a power signal that is the minimum reflection coefficient is input to the third oscillation circuit from the determination circuit, the second oscillation circuit stops output, and the third oscillation circuit outputs as the second power signal a power signal with a frequency of an absolute value of a difference between a frequency of a power signal that is the minimum reflection coefficient and a frequency of the first power signal. The third oscillation circuit is also called a conversion carrier oscillation circuit.

A power feeding system includes the above-described power feeding device and the power receiver. The above is one embodiment of the power feeding device and the power feeding system disclosed in this specification.

The second oscillation circuit can include a circuit that outputs a voltage that continuously changes with time (hereinafter also referred to as a "sweep voltage circuit"), and a circuit that changes a frequency of a signal that is output according to a voltage that is input (VCO: Voltage Controlled Oscillator). The third oscillation circuit can include a circuit (also called a "voltage specification circuit") that outputs a certain voltage that is specified based on information of a frequency from the determination circuit, and the voltage controlled oscillator. Note that the voltage controlled oscillator can be shared between the second oscillation circuit and the third oscillation circuit.

Note that the power feeding device can find out a position of the power receiver from a resonant frequency and its intensity. The position of the power receiver can also be referred to as the distance between the power feeding device and the power receiver.

Note that the power receiver includes a power receiving device portion, and the power receiving device portion includes a transmission/reception circuit portion for a power receiving device portion which transmits and receives an electromagnetic wave; a signal processing circuit portion for a power receiving device portion which processes a power signal of an electromagnetic wave that is transmitted/received by the transmission/reception circuit portion for a power receiving device portion; a power load portion; and a power storage portion which stores power transmitted from the power feeding device and contains a secondary battery that supplies power that is consumed by the power load portion. The power receiving device portion may be further provided with a detection portion that detects a voltage, a current, or a voltage and a current of the secondary battery.

In the power receiver, the power load portion can be operated using power that is stored in the power storage portion of the power receiving device portion. In this specification, a power receiver refers to an object that is operated using received power as a driving power, and examples of the power receiver include mobile electronic devices such as mobile phones, transportation means driven by an electric motor using power (automobiles, motorized bicycles, aircrafts, ships, and railroad cars), and the like.

Note that the power feeding device can identify and manage the power receiver by receiving the identification information of the power receiver. That is, the power receiving device portion may include a memory portion which stores identification information that is readout by the signal processing circuit portion for a power receiving device portion, and the signal processing circuit portion for a power feeding device includes an identification function for identifying the identification information.

Note that the antenna circuit may include a matching circuit for impedance adjustment.

Further, the power feeding device and the power receiver may include an amplification circuit.

Next, one embodiment of a power feeding method disclosed in this specification is as follows.

A first step of calculating a proportion of signals, among power signals output to the antenna circuit, that return from an antenna circuit of the power receiver and outputting a determination result of whether or not a reflection coefficient obtained by the calculation is less than or equal to a standard reflection coefficient, after transmission of a power signal from the antenna circuit of a power feeding device to the power receiver begins, is performed.

A second step is performed in which the power feeding device continually transmits the power signal to the power receiver from the antenna circuit in a case where the reflection coefficient of the power signal transmitted from the antenna circuit to the power receiver is less than or equal to the standard reflection coefficient in the first step.

A third step is performed in which the power feeding device continually changes with time a frequency of a power signal transmitted to the power receiver from the antenna circuit in a case where the reflection coefficient of the power signal transmitted from the antenna circuit to the power receiver is more than or equal to the standard reflection coefficient in the first step.

A fourth step of calculating after the third step a reflection coefficient of a power signal with a frequency that changes continuously with time, and detecting a frequency (resonant frequency) of a power signal that corresponds to the minimum reflection coefficient, is performed.

A fifth step of transmitting the power signal of the detected frequency from the antenna circuit to the power receiver is performed.

A step may be performed in which the power receiver detects a voltage, a current, or a voltage and a current of a secondary battery included in the power receiver, and depending on the detected information, the power receiver transmits a power feeding request signal or a power reception end signal to the power feeding device.

Also, in the above structure, a step of recognizing identification information of the power receiver with the power feeding device may be performed before the first step.

In power feeding performed by the power feeding device and the power receiver, the power feeding device transmits a power signal to the power receiver at an optimum frequency with high transmission efficiency; accordingly, power can be supplied to the power receiver without waste. Also, specification of the optimum frequency with high transmission efficiency is performed in the power feeding device by determining a reflection coefficient. Therefore, it is not necessary to transmit information for specifying the optimum frequency from the power receiver to the power feeding device, and a structure of the power receiver can be simplified.

Accordingly, a power feeding device, a power feeding system, and a power feeding method which are more convenient for a power feeding user at the power receiving end can be provided.

A power feeding device, a power feeding system, and a power feeding method which allows a power feeding provider (a company) on the power feeding side (power transmitting side) to supply power without waste, can be provided.

A power feeding device, a power feeding system, and a power feeding method by which an efficient power feeding service is possible for both the user and the provider, by specifying and managing the power feeding user on the power receiving end and properly controlling the amount of power supplied to a power receiver, can be provided.

DETAILED DESCRIPTION OF THE INVENTION

Hereinafter, embodiments of the present invention will be described in detail with reference to the accompanying drawings. However, the present invention is not limited to the description below, and it is easily understood by those skilled in the art that modes and details disclosed herein can be modified in various ways without departing from the spirit and the scope of the present invention. Therefore, the present invention is not construed as being limited to description of the embodiments.

Embodiment 1

In this embodiment, an embodiment of a wireless power feeding system and a wireless power feeding method is described with reference to FIGS. 1 to 4, and FIG. 11.

Figure 4:
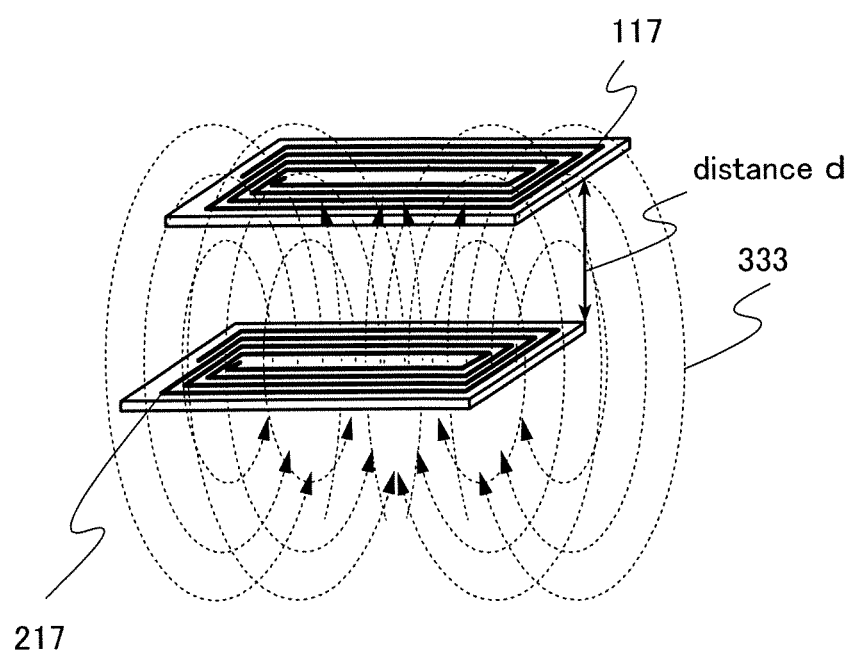
FIG. 4 illustrates an embodiment of a wireless power feeding system and a wireless power feeding method.

Note that in this specification, a distance between a power feeding device and a power receiver is the shortest distance between an antenna provided in the power feeding device and an antenna of the power receiver. FIG. 4 illustrates an example of power feeding with a distance d between a power receiver antenna 117 included in a power receiver and a power feeding device antenna 217 included in a power feeding device. In FIG. 4, the power receiver antenna 117 and the power feeding device antenna 217 are positioned with a distance d therebetween, and power feeding is performed by generating a magnetic field 333. FIG. 4 illustrates an example of power feeding by an electromagnetic induction method using coil antennas as antennas, and illustrates an embodiment of an antenna shape and a transmission method of an electromagnetic wave which can be employed in the invention disclosed in this specification.

In this specification, there is no particular limitation on a frequency of a power feeding electromagnetic wave and the frequency may be in any frequency band as long as power can be transmitted. For example, the frequency of a power feeding electromagnetic wave may be in any of an LF band of 135 kHz (long wave), an HF band of 13.56 MHz, a UHF band of 900 MHz to 1 GHz, and a microwave band of 2.45 GHz.

In this specification, the frequency of the electromagnetic wave used as a variety of signals (such as electrical signal transmitting identification information and the like) may be in the same frequency band as a power feeding electromagnetic wave or may be in a different frequency band. Note that in the case where a different frequency band is used, an antenna corresponding to the frequency is preferably provided.

In this specification, a transmission method of electromagnetic waves may be appropriately selected from a variety of methods such as an electric field coupling method, an electromagnetic induction method, a resonance method, and a microwave method. In order to prevent energy loss due to foreign substances containing moisture, such as rain or mud, the electromagnetic induction method or the resonance method using a low frequency band, specifically, frequencies of a short wave of 3 MHz to 30 MHz, a medium wave of 300 kHz to 3 MHz, a long wave of 30 kHz to 300 kHz, or a very-low wave of 3 kHz to 30 kHz, is preferably used.

Figure 2:
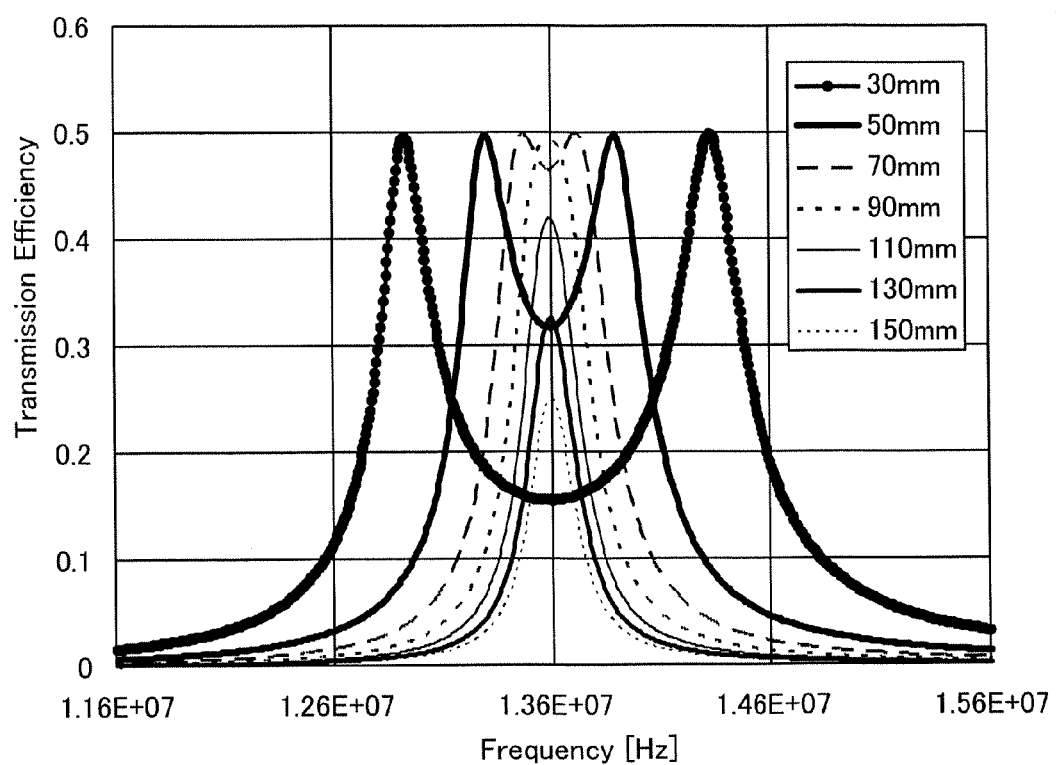
FIG. 2 illustrates a relationship between frequency and intensity of a power signal.

FIG. 2 shows results of an experiment in which two antennas having an identical shape are disposed to face each other as illustrated in FIG. 4, and a signal having a frequency f with a voltage amplitude $V_a$ is transmitted from one of the antennas and the amplitude $V_b$ received by the other antenna is measured, at varying frequencies of the signal transmitted from one antenna and with varying transmission distances d between the two antennas having an identical shape. Specifically, conditions of frequency f is changed from 11.6 MHz to 15.6 MHz, and transmission distance d is changed from 30 mm, 50 mm, 70 mm, 90 mm, 110 mm, 130 mm, and 150 mm. The antennas used for the experiment are coil antennas, and each have a size of 72 mm×42 mm, 4 loops, a line width of 0.5 mm, a line interval of 0.5 mm, an inductance of about 2.6 μH, a parasitic capacitance of about 4 pF, and a resistance of about 1Ω. Note that the transmission efficiency in FIG. 2 is $V_b/V_a$ where a signal with a voltage amplitude $V_a$ is output from one of the antennas and received by the other antenna and a voltage $V_b$ is generated between two terminals of the other antenna.

Figure 11:
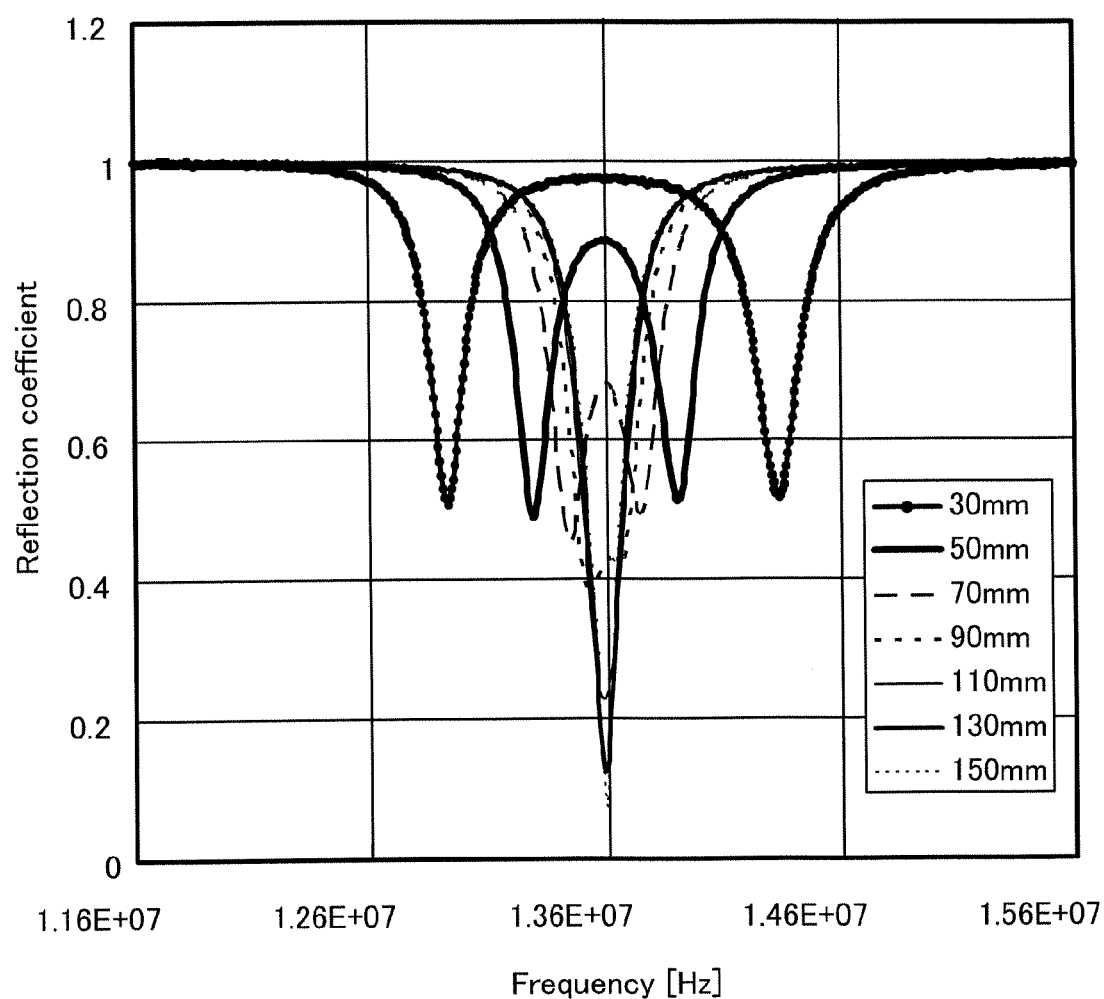
FIG. 11 illustrates a relationship between frequency and a reflection coefficient of a power signal.

Here, transmission efficiency and the reflection coefficient of a power signal has a close relationship. FIG. 11 illustrates a result of investigating a proportion (reflection coefficient) of signals that return from one antenna to another antenna without feeding power to the power receiver when data of the transmission efficiency illustrated in FIG. 2 is obtained. When FIG. 2 and FIG. 11 are compared, it can be observed that the higher the transmission efficiency of a frequency of a power signal, the smaller the reflection coefficient thereof compared to a power signal of another frequency, and the reflection coefficient of the power signal of the resonant frequency $f_{MAX(a)}$, with which the transmission efficiency reaches the maximum value, reaches the minimum value compared to the power signal of the other frequency.

In view of this, characteristics of one embodiment of the present invention is that it focuses on the relationship between the transmission efficiency and the reflection coefficient, and a power feeding device has a function of controlling the value of frequency f of a power signal to be transmitted, so that the transmission efficiency is at a predetermined value (standard transmission efficiency) or higher, or at a maximum. Note that it is not necessary for the power receiver to have a function of controlling the value of frequency f of a power signal to be transmitted. In this manner, the power feeding device can supply power to the power receiver without waste by transmitting a power signal to the power receiver at an optimum frequency for high power transmission efficiency.

Note that as shown in FIG. 2, when the distance between the power feeding device and the power receiver becomes short as in 70 mm, 50 mm, and 30 mm, two resonant frequencies with different frequencies are detected. In response to this, as shown in FIG. 11, with resonant frequencies, reflection coefficients become the minimum compared to other frequencies. That is, when the distance between the power feeding device and the power receiver is fixed and when there are two resonant frequencies, there are also two minimum values of reflection coefficients.

By making a power signal to be transmitted to the power receiver to be a signal including two signals corresponding to the two resonant frequencies with different frequencies, transmission efficiency becomes favorable.

For example, by multiplying an angular frequency of b by an angular frequency of α, a signal with frequencies of b+α and b−α are generated according to Formula (I) below. When the resonant frequencies are b+α and b−α, transmission efficiency is favorable when transmitting power signals with frequencies of b+α and b−α from the power feeding device.

[FORMULA 1]

$$\cos(b \cdot t) \cdot \cos(\alpha \cdot t) = \frac{1}{2}\{\cos((b-\alpha) \cdot t) + \cos((b+\alpha) \cdot t)\} \quad (1)$$

Figure 1:
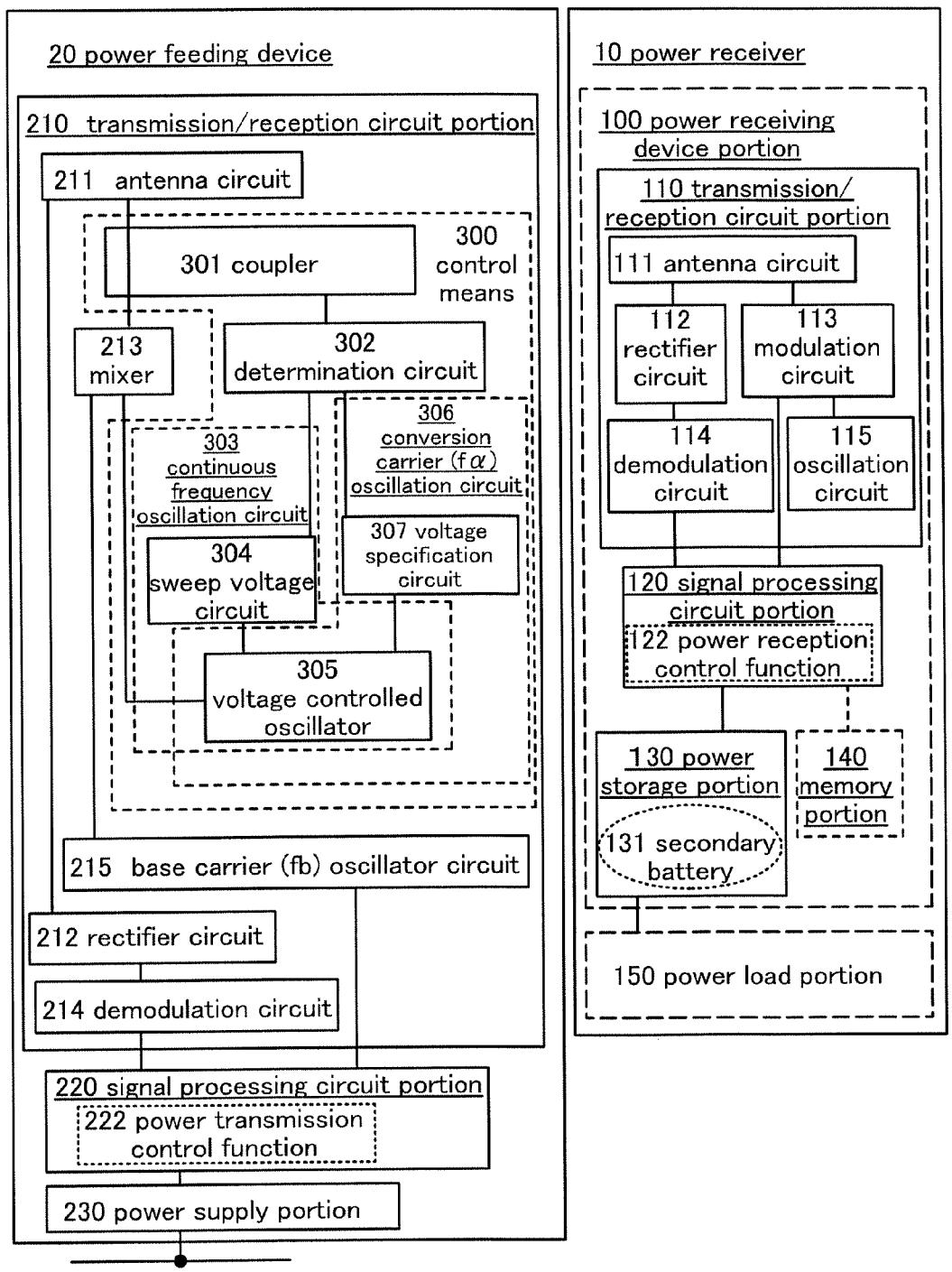
FIG. 1 illustrates an embodiment of a wireless power feeding system and a wireless power feeding method.

In view of the above, an embodiment of a wireless power feeding system of the present invention is illustrated in FIG. 1. FIG. 1 illustrates components of a power feeding device and a power receiver included in a wireless power feeding system, in separate blocks according to function. However, a component and a function are not necessarily a one-to-one relation, and a power feeding system may operate by relating a plurality of components and a plurality of functions to each other.

In the wireless power feeding system in FIG. 1, a power feeding device 20 and a power receiver 10 transmit and receive signals to and from each other wirelessly (by an electromagnetic wave), and power is supplied from the power feeding device 20 to the power receiver 10 without contact.

The power feeding device 20 includes a transmission/reception circuit portion 210 which transmits and receives electromagnetic waves, a signal processing circuit portion 220 which processes electrical signals of the transmitted and received electromagnetic waves, and a power supply portion 230 which supplies power transmitted to the power receiver 10.

The transmission/reception circuit portion 210 includes an antenna circuit 211, a rectifier circuit 212, a mixer 213, a demodulation circuit 214, a base carrier ($f_b$) oscillation circuit 215, and a control means 300.

The base carrier ($f_b$) oscillation circuit 215 is a circuit for generating a base carrier that is a signal of the frequency $f_b$ which is a standard of the power feeding device 20, and the base carrier is the first power signal.

The control means 300 outputs the second power signal.

The mixer 213 mixes the first power signal generated in the base carrier ($f_b$) oscillation circuit 215 and the second power signal generated in the control means 300, and outputs a resulting signal to the antenna circuit.

The control means 300 includes a coupler 301, a determination circuit 302, a continuous frequency oscillation circuit 303, and a conversion carrier ($\Delta f_\alpha$) oscillation circuit 306. The continuous frequency oscillation circuit 303 outputs a power signal with a frequency that continuously changes with time, and the conversion carrier ($\Delta f_\alpha$) oscillation circuit 306 outputs a power signal with one specified frequency. An output from the continuous frequency oscillation circuit 303 and an output from the conversion carrier ($\Delta f_\alpha$) oscillation circuit 306 are outputs of the control means 300, which are the second power signal.

The continuous frequency oscillation circuit 303 includes a sweep voltage circuit 304 and a voltage controlled oscillator 305. The conversion carrier ($\Delta f_\alpha$) oscillation circuit 306 includes a voltage specification circuit 307 and the voltage controlled oscillator 305. The sweep voltage circuit 304 is a circuit that outputs a voltage that continuously changes with time. The voltage controlled oscillator 305 is a VCO (Voltage Controlled Oscillator), and is a circuit that changes a frequency of a signal that is output according to a voltage that is input. The continuous frequency oscillation circuit 303 and the conversion carrier ($\Delta f_\alpha$) oscillation circuit 306 share the voltage controlled oscillator 305.

The coupler 301 detects a signal which is reflected from the power receiver 10 and received by the antenna circuit 211.

The determination circuit 302 calculates a reflection coefficient from the signal detected by the coupler 301, and outputs a determination result of whether or not the reflection coefficient obtained from the calculation is less than or equal to a standard reflection coefficient or detects a frequency of a power signal with the smallest reflection coefficient and outputs information of a frequency of the power signal. Note that information of this frequency corresponds to an absolute value of a difference between a frequency of a power signal that is the minimum reflection coefficient and a frequency of a base carrier output from the base carrier ($f_b$) oscillation circuit 215. Furthermore, the frequency of the power signal that is the minimum reflection coefficient is the resonant frequency $f_{MAX(a)}$ and can be expressed as $f_b \pm \Delta f_\alpha$. Here, information of a frequency output from the determination circuit 302 corresponds to $\Delta f_\alpha$. $\Delta f_\alpha$ is also called a frequency of a conversion carrier.

When a determination result is input from the determination circuit 302 and a reflection coefficient is less than or equal to a standard reflection coefficient, the continuous frequency oscillation circuit 303 stops output, the conversion carrier ($\Delta f_\alpha$) oscillation circuit 306 maintains output, and the second power signal becomes an output of the conversion carrier ($\Delta f_\alpha$) oscillation circuit 306. Here, the conversion carrier ($\Delta f_\alpha$) oscillation circuit 306 maintaining output means that the output of the conversion carrier ($\Delta f_\alpha$) oscillation circuit 306 is maintained when a reflection coefficient that is less than or equal to the standard reflection coefficient is calculated. Note that when the reflection coefficient is less than or equal to the standard reflection coefficient when there is no output from the conversion carrier ($\Delta f_\alpha$) oscillation circuit 306, the second power signal is stopped.

When a determination result is input from the determination circuit 302 and the reflection coefficient is larger than the standard reflection coefficient, output from the conversion carrier ($\Delta f_\alpha$) oscillation circuit 306 is stopped, and an output of the continuous frequency oscillation circuit 303 is output as the second power signal. Here, the second power signal is a power signal with a frequency that continuously changes with time. By mixing the first power signal and this second power signal with the mixer 213, a power signal with continuous frequency with the frequency of the base carrier ($f_b$) as a main frequency is output from the antenna circuit 211. By calculating a reflection coefficient of the power signal with continuous frequency with the frequency of the base carrier ($f_b$) as a main frequency, a frequency with the minimum reflection coefficient can be detected. This frequency is the resonant frequency $f_b \pm \Delta f_\alpha$.

When information ($\Delta f_\alpha$) of a frequency of a power signal that is the minimum reflection coefficient is input to the conversion carrier ($\Delta f_\alpha$) oscillation circuit 306 from the determination circuit 302, the continuous frequency oscillation circuit 303 stops output, and the conversion carrier ($\Delta f_\alpha$) oscillation circuit 306 outputs as the second power signal a power signal with a frequency of an absolute value of a difference between a frequency of a power signal that is the minimum reflection coefficient and a frequency of the first power signal (base carrier). By mixing this second power signal and the first power signal with the mixer 213, the power signal for the resonant frequency $f_b \pm \Delta f_\alpha$ can be generated.

By the above-described circuits included in the control means 300, the power feeding device 20 can detect the resonant frequency $f_b \pm \Delta f_\alpha$ when the reflection coefficient is larger than a predetermined value (the standard reflection coefficient), and can output the power signal of the resonant frequency $f_b \pm \Delta f_\alpha$ from the antennas of the power feeding device 20.

In this manner, the power feeding device 20 can supply power to the power receiver without waste by transmitting two power signals with different optimum frequencies with high power transmission efficiency to the power receiver 10.

Although in the structure shown in FIG. 1, the voltage controlled oscillator 305 is shared between the continuous frequency oscillation circuit 303 and the conversion carrier ($\Delta f_\alpha$) oscillation circuit 306, the voltage controlled oscillator may be provided for each of the continuous frequency oscillation circuit 303 and the conversion carrier ($\Delta f_\alpha$) oscillation circuit 306.

An electromagnetic wave (signal) received by the antenna circuit 211 is converted into an electrical signal by the antenna circuit 211 and rectified in the rectifier circuit 212. The rectified signal is demodulated in the demodulation circuit 214 and then transmitted to the signal processing circuit portion 220. The antenna circuit 211 may include a matching circuit for impedance adjustment.

The power supply portion 230 is connected to a power supply network or a power generation system in order to supply power to the power receiver 10.

The power receiver 10 includes a power receiving device portion 100 and a power load portion 150, and the power receiving device portion 100 includes a transmission/reception circuit portion 110 which transmits and receives electromagnetic waves, a signal processing circuit portion 120 which processes electrical signals of the transmitted and received electromagnetic waves, a memory portion 140, and a power storage portion 130 including a secondary battery 131 which stores power transmitted from the power feeding device 20.

The transmission/reception circuit portion 110 includes an antenna circuit 111, a rectifier circuit 112, a modulation circuit 113, a demodulation circuit 114, and an oscillation circuit 115.

An electromagnetic wave (signal) received by the antenna circuit 111 is converted into an electrical signal by the antenna circuit 111 and rectified in the rectifier circuit 112. The rectified signal is demodulated in the demodulation circuit 114 and then transmitted to the signal processing circuit portion 120. On the other hand, the modulation circuit 113 applies a voltage to the antenna circuit 111 in accordance with a signal with a constant frequency generated in the oscillation circuit 115, whereby a transmitter signal generated in the signal processing circuit portion 120 is transmitted from the antenna circuit 111 to the power feeding device 20 as an electromagnetic wave (signal).

In the case where the received electromagnetic wave is an electromagnetic wave for power reception, it is converted into an electrical signal by the antenna circuit 111 and rectified in the rectifier circuit 112, and then stored in the secondary battery 131 of the power storage portion 130 via the signal processing circuit portion 120, as power (electric energy).

The secondary battery 131 is a charge storage means, and for example, a lead-acid battery, a nickel-cadmium battery, a nickel-hydride battery, or a lithium-ion battery can be used.

Note that in block diagrams in FIG. 1, a DC-DC converter can be provided as appropriate. In addition, in the power storage portion 130, a power supply circuit or an overcharge control circuit for controlling operation of the power supply circuit so as to prevent overcharging of the secondary battery 131 may be provided as appropriate, and the power supply circuit can supply power (electric energy) stored in the secondary battery 131, which is made constant, to the power load portion 150.

The power storage portion 130 may include a discharge control circuit. The discharge control circuit has a function of controlling the supply of power or the amount of power to be supplied to the power load portion 150. The discharge control circuit makes it possible to supply power as needed or adjust the amount of power to be supplied.

Although not illustrated in FIG. 1 (and FIG. 6), the power receiving device portion 100 includes a power supply circuit and a capacitor for generating power to be supplied to the power receiving device portion 100. In the transmission/reception circuit portion 110, power is generated from the signal received by the antenna circuit 111. A rectifier circuit is used for the generation of power. The generated power is supplied to the transmission/reception circuit portion 110, the signal processing circuit portion 120, and the memory portion 140. Note that in the case where power is stored in the secondary battery 131 of the power storage portion 130, power may be supplied from the secondary battery 131 to the transmission/reception circuit portion 110, the signal processing circuit portion 120, the memory portion 140, and the like. In the case of having a structure in which power is supplied from the secondary battery 131, the power supply circuit and the capacitor for generating power to be supplied to the power receiving device portion 100 are not necessarily provided.

The signal processing circuit portion 220 of the power feeding device 20 is provided with a power transmission control function 222 for controlling power transmitted to the power receiver 10.

On the other hand, the signal processing circuit portion 120 of the power receiver 10 is provided with a power reception control function 122 for controlling power received from the power feeding device 20.

Furthermore, the power feeding device and the power receiver may include an amplification circuit.

Figure 3:
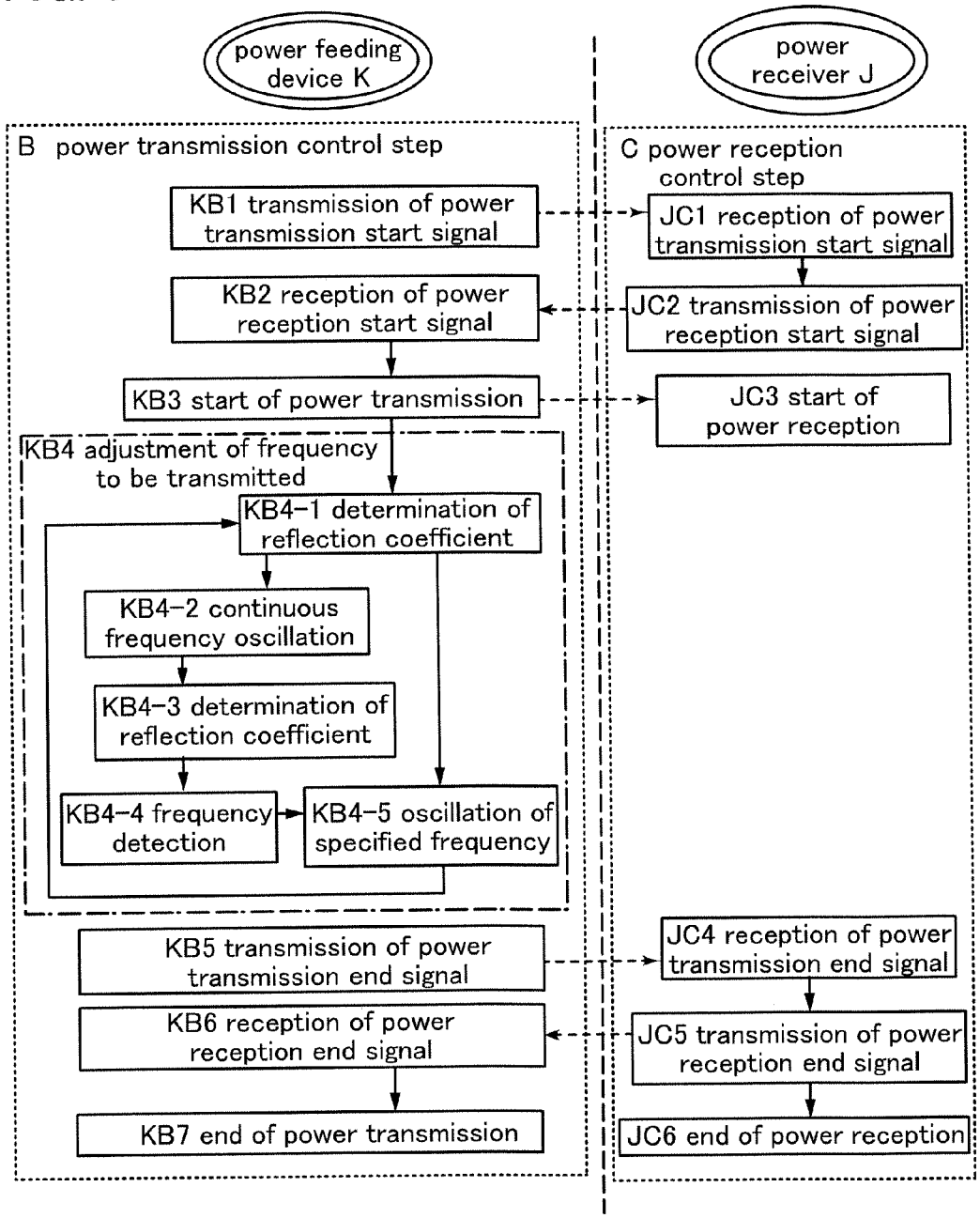
FIG. 3 illustrates an embodiment of a wireless power feeding system and a wireless power feeding method.

An embodiment of a wireless power feeding method is illustrated in a flow chart of FIG. 3. Note that a power feeding device K corresponds to the power feeding device 20 in FIG. 1 and a power receiver J corresponds to the power receiver 10 in FIG. 1.

The power feeding device K performs a (B power transmission control step) and the power receiver J performs a (C power reception control step). Each step will be described in detail below.

The power feeding device K transmits a power transmission start signal to the power receiver J (KB1: transmission of a power transmission start signal) and the power receiver J receives the power transmission start signal (JC1: reception of the power transmission start signal), and transmits a power reception start signal after preparation for power reception is completed (JC2: transmission of a power reception start signal). The power feeding device K receives the power reception start signal from the power receiver J (KB2: reception of the power reception start signal) and starts power transmission of a power signal (KB3: start of power transmission). When power transmission is performed by the power feeding device K, the power receiver J starts power reception (JC3: start of power reception).

After that, the power feeding device K adjusts a frequency to be transmitted (KB4: adjustment of frequency to be transmitted). In adjusting the frequency to be transmitted, the following operation is performed.

A proportion of signals, among power signals output to an antenna circuit, that return from the antenna circuit of the power receiver is calculated, and a determination result of whether or not a reflection coefficient obtained by the calculation is less than or equal to a standard reflection coefficient is output (KB4-1: determination of reflection coefficient).

When the reflection coefficient of the power signal is less than or equal to the standard reflection coefficient, the power signal is continually transmitted to the power receiver J from the antenna circuit of the power feeding device K (KB4-5: oscillation of specified frequency).

When the reflection coefficient of the first power signal is more than or equal to the standard reflection coefficient, a frequency of the power signal transmitted to the power receiver J from the antenna circuit of the power feeding device K is continually changed with time (KB4-2: continuous frequency oscillation).

A reflection coefficient of the power signal with which the frequency continually changes with time is calculated (KB4-3: determination of reflection coefficient), and a frequency of the power signal that is the minimum reflection coefficient is detected (KB4-4: frequency detection).

The power signal of the detected frequency is transmitted to the power receiver J from the antenna circuit of the power feeding device K (KB4-5: oscillation of specified frequency).

After (KB4-5: oscillation of specified frequency), the operation returns to a flow of (KB4-1: determination of reflection coefficient) and is repeated.

The power feeding device K transmits an appropriate amount of power, and then transmits a power transmission end signal to the power receiver J (KB5: transmission of power transmission end signal). After the power receiver J receives the power transmission end signal from the power feeding device K (JC4: reception of power transmission end signal), a power reception end signal is transmitted to the power feeding device K (JC5: reception of power reception end signal), and power reception ends (JC6: end of power reception). The power feeding device K receives the power reception end signal from the power receiver J (KB6: reception of power reception end signal), and power transmission ends (KB7: end of power transmission).

Note that in the power feeding device K, the start or end of power transmission may be performed at the same time as transmission of a power transmission start signal or transmission of a power transmission end signal. The start or end of power reception may also be performed at the same time as transmission of a power reception start signal or transmission of a power reception end signal. Since the power transmission and the power reception relate to each other, the power reception of the power receiver J can start at the same time as the start of power transmission of the power feeding device K and the power reception of the power receiver J can end at the same time as the end of the power transmission of the power feeding device K. FIG. 3 shows an example where the power feeding device K transmits the end of the power feeding to the power receiver J to end the power transmission, and the power receiver J can request the end of the power feeding of the power feeding device K to end the power transmission of the power feeding device K.

The power receiver J receives a supply of power from the power feeding device K in this manner, and can store the power in the secondary battery 131 in the power storage portion 130 of the power receiving device portion 100. Then, using the power that is stored, the power load portion 150 can be operated. In this specification, a power receiver means an object which operates using received power as a driving power, and examples of the power receiver include portable electronic devices such as mobile phones, laptop personal computers, cameras such as digital cameras or digital video cameras, digital photo frames, portable game machines, personal digital assistants, and electronic books, transportation means driven by an electric motor using power (automobiles (automatic two-wheeled vehicles, automobiles with three or more wheels), motorized bicycles including motor-assisted bicycles, aircrafts, ships, and railroad cars), and the like.

Figure 10:
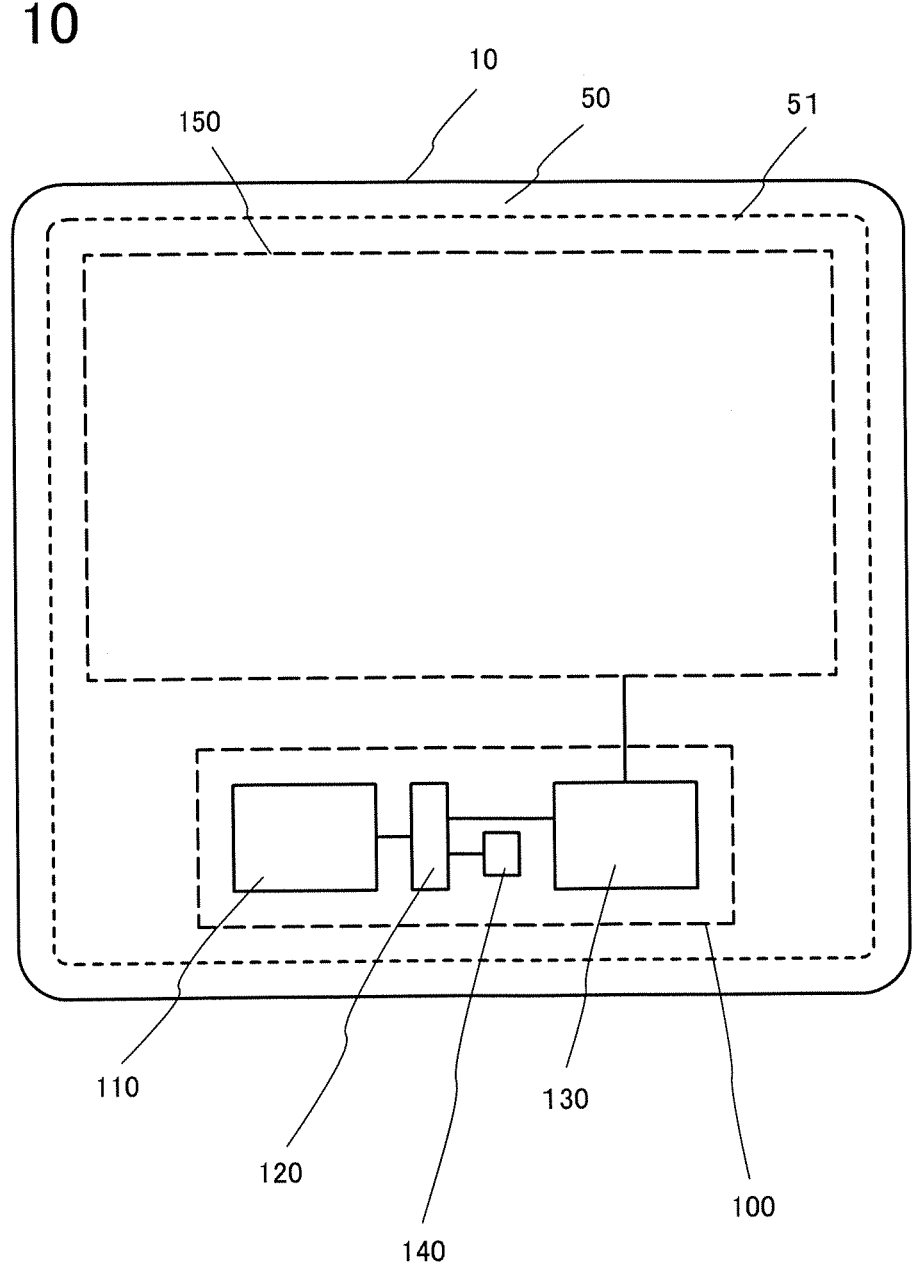
FIG. 10 illustrates an embodiment of a power receiver.

FIG. 10 illustrates a personal digital assistant (PDA) as an example of the power receiver. The power receiver 10 in FIG. 10 is a personal digital assistant including a display panel 51 in a housing 50. In the housing 50, the power receiving device portion 100 and the power load portion 150 are provided under the display panel 51, and the power receiving device portion 100 includes the transmission/reception circuit portion 110 which includes the antenna circuit, the rectifier circuit, the modulation circuit, the demodulation circuit, the oscillation circuit, and the like; the signal processing circuit portion 120; the memory portion 140; and the power storage portion 130 including the secondary battery. An electromagnetic wave received by the transmission/reception circuit portion 110 is stored in the secondary battery of the power storage portion 130 via the signal processing circuit portion 120. By the supply of power stored in the secondary battery to the power load portion 150, a semiconductor integrated circuit and the like provided in the power load portion 150 can be driven and an image can be displayed on the display panel 51; thus, the power receiver 10 can be operated as a personal digital assistant.

In this manner, the power feeding device can supply power to the power receiver without waste by transmitting a power signal to the power receiver at an optimum frequency for high power transmission efficiency. As a result, power feeding which is efficient and convenient for both the power feeding device and the power receiver can be performed.

By the power feeding system and the power feeding method in this embodiment, a power receiver user can obtain more convenience and higher added values.

It is also possible to provide a company at the power feeding side with a power feeding system and a power feeding method which can offer a variety of efficient services.

Embodiment 2

In this embodiment, another embodiment of a wireless feeding system and a wireless power feeding method is described with reference to FIG. 5 and FIG. 6.

Figure 6:
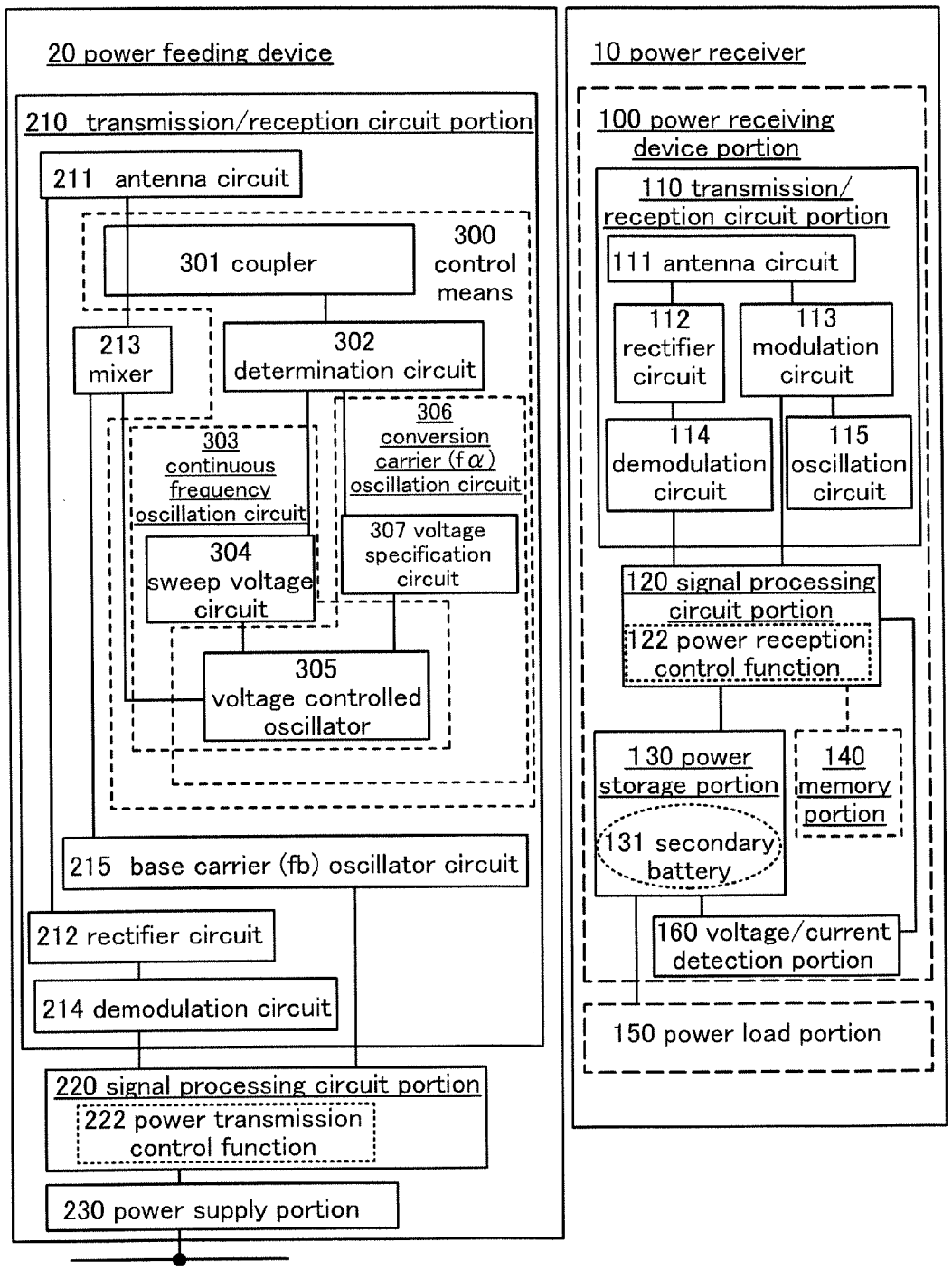
FIG. 6 illustrates an embodiment of a wireless power feeding system and a wireless power feeding method.

FIG. 6 illustrates components of a power feeding device and a power receiver included in the wireless power feeding system of this embodiment, in separate blocks according to function. FIG. 6 illustrates an example where a detection portion (a voltage/current detection portion 160) which detects the amount of power stored in the secondary battery 131 of the power storage portion 130 is provided in the wireless power feeding system in FIG. 1 described in Embodiment 1, and the same portions as or portions having functions similar to those in Embodiment 1 are similar to those in Embodiment 1 and repetitive description will be omitted. In addition, detailed description of the same portions is not repeated.

The voltage/current detection portion 160 detects a voltage, a current, or a voltage and a current of the secondary battery 131 of the power storage portion 130 to find out the amount of power storage of the secondary battery 131 and transmits the information to the signal processing circuit portion 120, so that the signal processing circuit portion 120 controls power reception.

Figure 5:
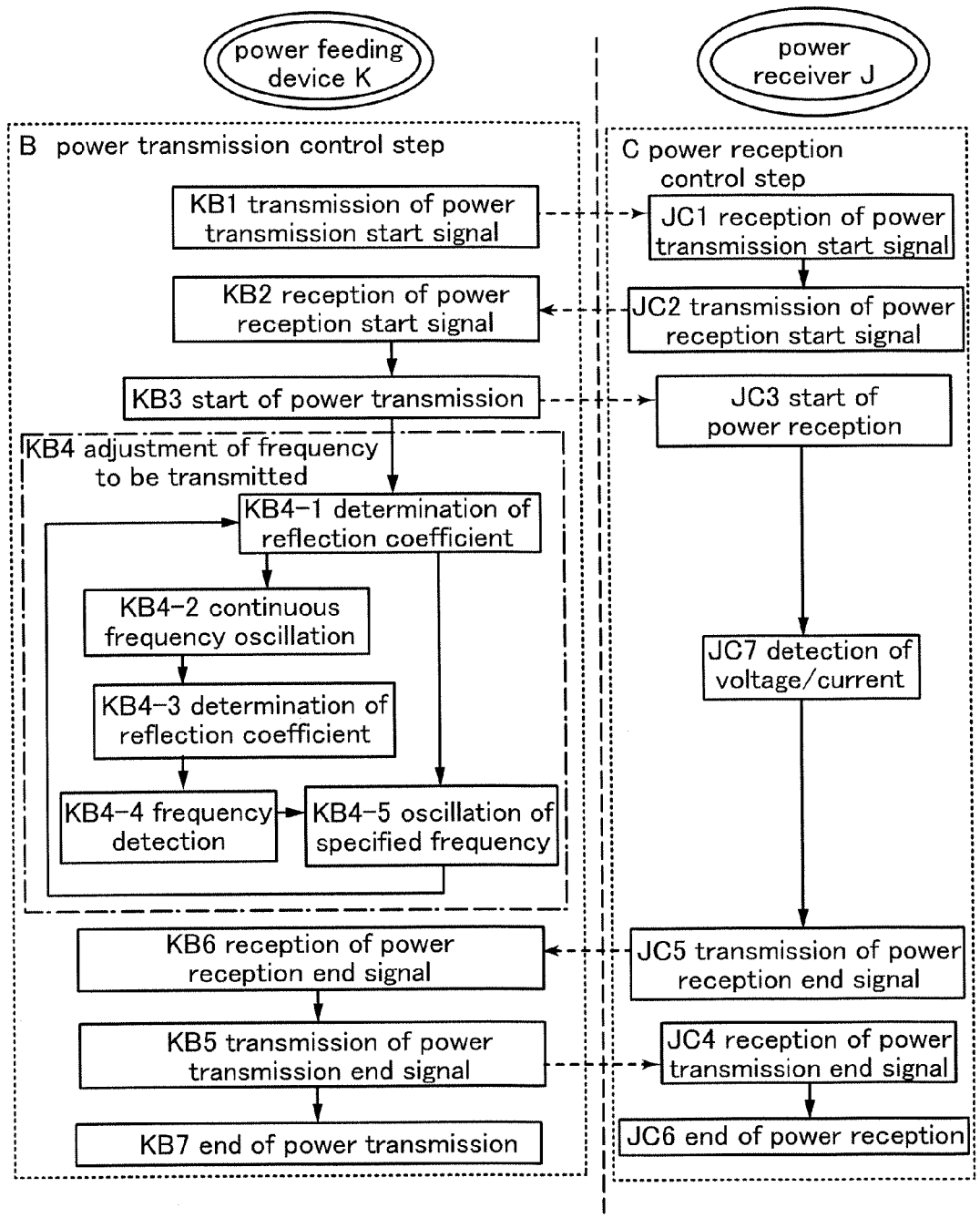
FIG. 5 illustrates an embodiment of a wireless power feeding system and a wireless power feeding method.

An embodiment of a wireless power feeding method is illustrated in a flow chart of FIG. 5. Note that a power feeding device K and a power receiver J correspond to the power feeding device 20 and the power receiver 10 in FIG. 6, respectively.

In this embodiment, an example is shown in which detection information of the amount of power storage of the secondary battery 131 detected by the voltage/current detection portion 160 is also used for power feeding control. At the start of power reception by the power receiver J, the voltage/current detection portion 160 detects the voltage, the current, or the voltage and current of the secondary battery 131 (JC7: detection of voltage/current).

The voltage/current detection portion 160 finds out the amount of power stored in the secondary battery 131 by detecting the voltage, the current, or the voltage and current of the secondary battery 131, and when it is determined that the amount of power exceeds the capacity of the secondary battery 131, a power reception end signal is transmitted to the power feeding device K (JC5: transmission of power reception end signal). The power feeding device K receives the power reception end signal from the power receiver J (KB6: reception of power reception end signal), transmits a power transmission end signal to the power receiver J (KB5: transmission of power transmission end signal), and ends the power transmission (KB7: end of power transmission). The power receiver J receives (JC4: reception of power transmission end signal) the power transmission end signal from the power feeding device K and ends power reception (JC6: end of power reception).

Rest of the structure and steps are the same as FIG. 3 of Embodiment 1 and therefore omitted.

As in this embodiment, by finding out the amount of power stored in the secondary battery, appropriate power transmission that meets more of a demand of the user can be performed. Accordingly, waste of power due to excessive power transmission and deterioration of the secondary battery 131 caused by supply of the amount of power storage or more can be reduced. As a result, power feeding that is efficient and convenient for both the power feeding device and the power receiver can be performed.

This embodiment can be implemented in appropriate combination with the structures described in other embodiments.

Embodiment 3

In this embodiment, another embodiment of a wireless power feeding system and a wireless power feeding method is described with reference to FIG. 7 and FIGS. 8A and 8B. FIG. 1 and FIG. 10 are also referred to for the description.

In this embodiment, an example is described in which a step of recognizing identification information of the power receiver is added to Embodiment 1 or Embodiment 2. The same portions as or portions having functions similar to those in Embodiment 1 are similar to those in Embodiment 1 or 2 and repetitive description will be omitted. Furthermore, detailed description of the same portions is omitted.

Identification information can be stored in the memory portion 140 of the power receiver. Also, the signal processing circuit portion 220 of the power feeding device has an identification function for identifying the identification information.

Figure 7:
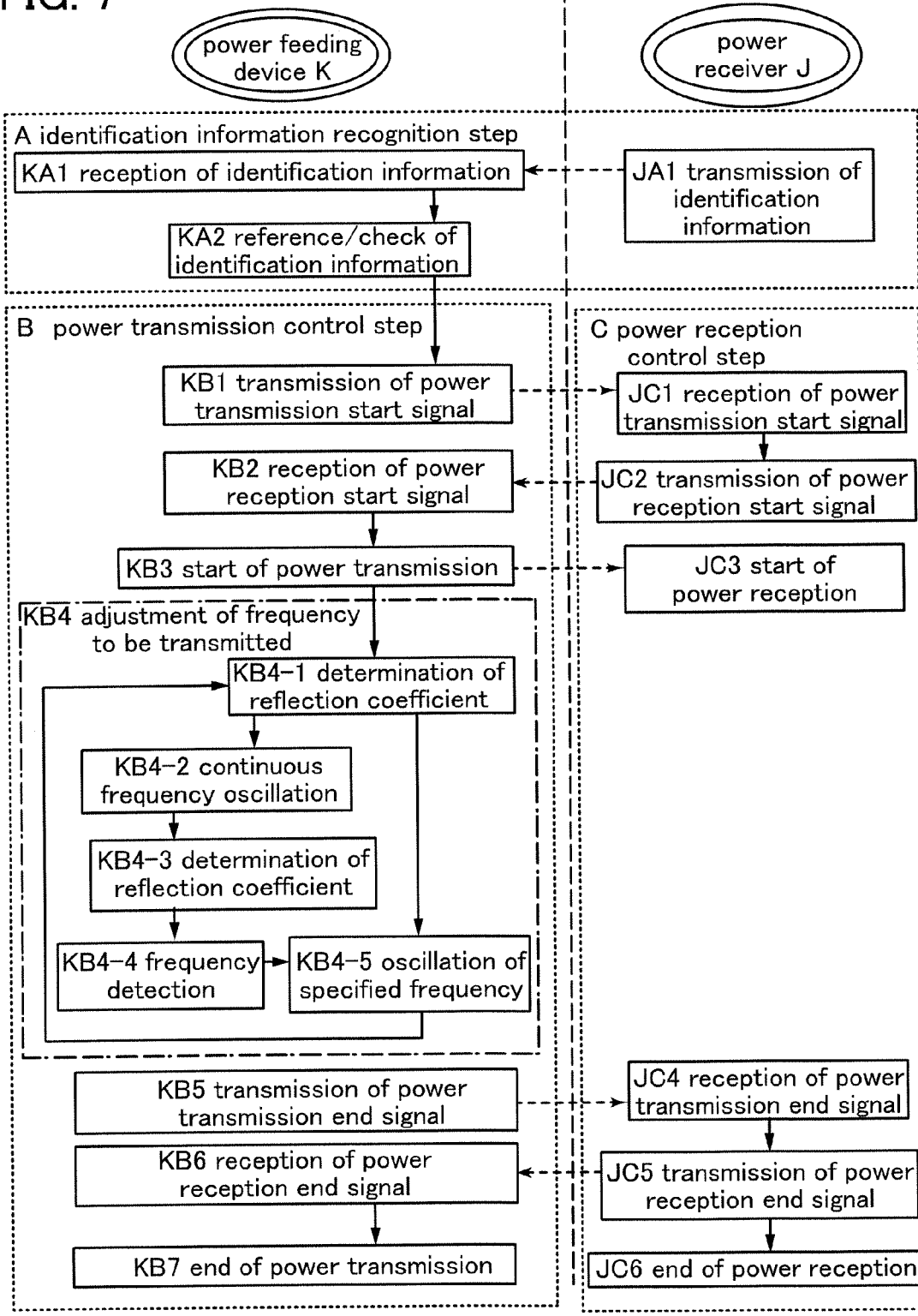
FIG. 7 illustrates an embodiment of a wireless power feeding system and a wireless power feeding method.

A wireless power feeding method of this embodiment is illustrated in a flow chart of FIG. 7. Note that a power feeding device K and a power receiver J correspond to the power feeding device 20 and the power receiver 10 in FIG. 1, respectively.

First, the power receiver J transmits identification information to the power feeding device K (JA1: transmission of identification information), and the power feeding device K receives the identification information of the power receiver J (KA1: reception of the identification information). The power feeding device K inquires about and checks the received identification information (KA2: reference/check of the identification information), and identifies the power receiver J (A: identification information recognition step). The process proceeds to the next step, and power feeding is performed in a manner similar to the power feeding method in FIG. 3 or FIG. 5.

The power feeding device K may store information for the identification in a memory portion in the power feeding device K in advance, or alternatively, in performing identification, the power feeding device K may communicate with another management server or the like and perform identification on the basis of information from the server. Alternatively, communication between the power feeding device K and the power receiver J may be started from the power feeding device K. For example, the power feeding device K may obtain identification information of the power receiver J from the power receiver J, and transmit a signal for asking identification information to the power receiver J and start communication in order to determine (search for) the power receiver J having the identification information.

The power feeding device K can adjust the intensity of a power signal to be transmitted, based on the identification information of the power receiver J. For example, by reading and considering the amount of power that can be stored in the secondary battery 131 of the power receiver J based on the identification information, the intensity and frequency of an electromagnetic wave to be transmitted, the power transmission time, and the like can be controlled.

Figure 8A:
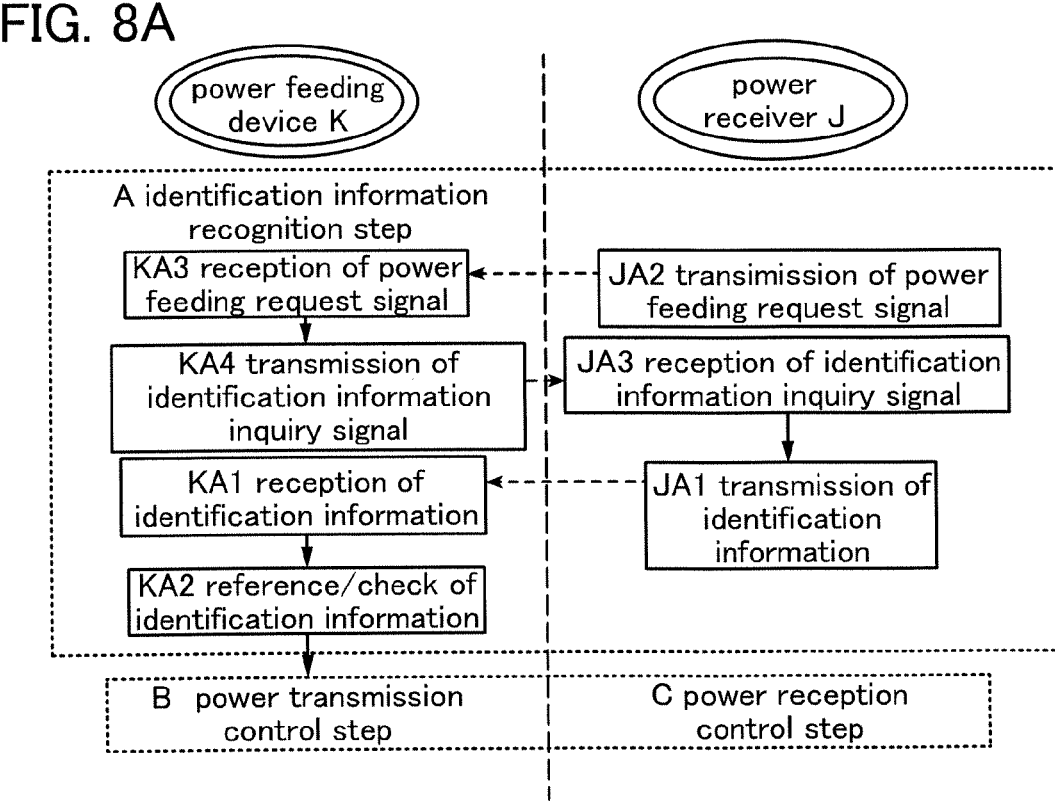
FIGS. 8A and 8B each illustrate an embodiment of a wireless power feeding system and a wireless power feeding method.

Alternatively, as in FIG. 8A, the power receiver J can request the start of power feeding of the power feeding device K to start power transmission from the power feeding device K. FIG. 8A illustrates an identification information recognition step, and the power receiver J transmits a signal requesting power feeding to the power feeding device K (JA2: transmission of power feeding request signal) first. The power feeding device K which is placed in a position where it can receive the power feeding request signal from the power receiver J receives the power feeding request signal (KA3: reception of power feeding request signal) and transmits a signal for inquiring about identification information of the power receiver J to the power receiver J in response to the power feeding request signal (KA4: transmission of identification information inquiry signal). The power receiver J receives the identification information inquiry signal from the power feeding device K (JA3: reception of identification information inquiry signal), and transmits the identification information of the power receiver J to the power feeding device K (JA1: transmission of identification information). The power feeding device K receives the identification information from the power reception J (KA1: reception of identification information), inquires about and checks the received identification information (KA2: reference/check of the identification information), and identifies the power receiver J. The process proceeds to the next step, and power feeding is performed in the same manner as the power feeding method in FIG. 3 or FIG. 5.

The transmission of the power feeding request signal from the power receiver J may be controlled by the user by taking into consideration the amount of power stored in the secondary battery of the power receiver, or the transmission may be set so as to be automatically performed depending on the amount of power stored in the secondary battery 131.

Figure 8B:
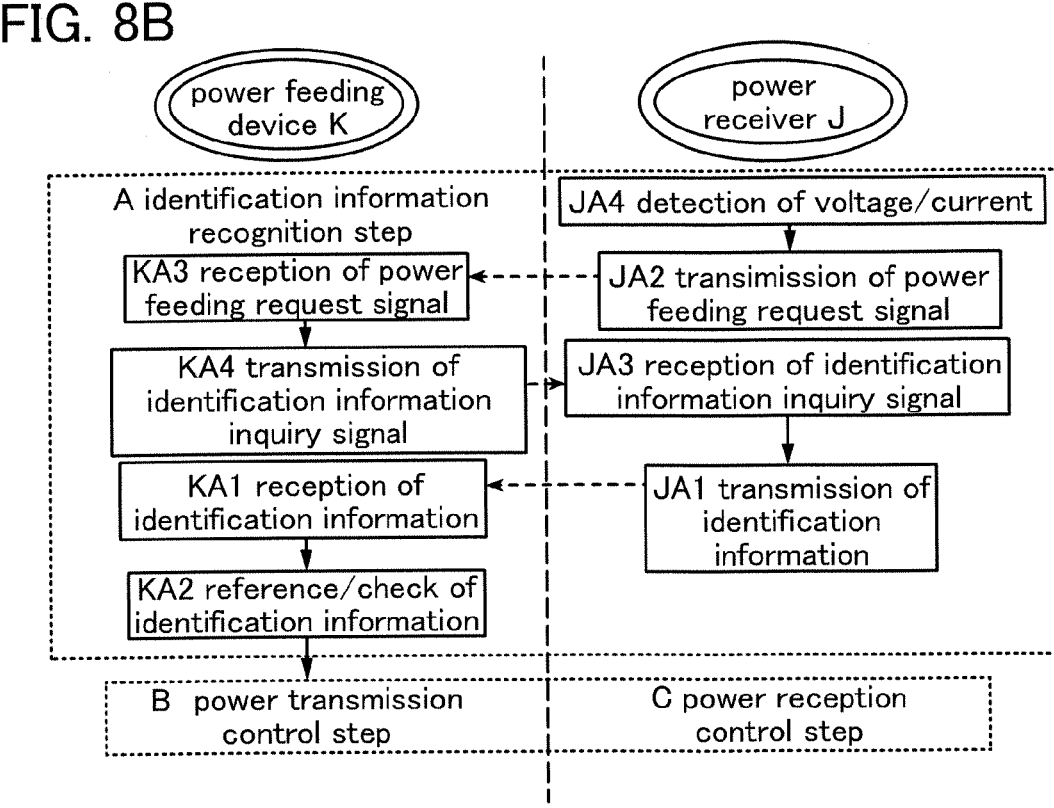

For example as shown in FIG. 8B, the voltage/current detection portion 160 detects a voltage, a current, or a voltage and a current of the secondary battery 131 (JA4: detection of voltage/current), and when the power receiver J determines that the amount of power stored in the secondary battery 131 is smaller than a certain amount of power, it transmits a power feeding request signal to the power feeding device K (JA2: transmission of power feeding request signal). The process proceeds to the next step, and power feeding is performed in the same manner as the power feeding method in FIG. 8A and FIG. 3 or FIG. 5.

Furthermore, by finding out the specific information of the power receiver J or the amount of power stored in the secondary battery, appropriate power transmission that meets more of a demand of the user can be performed. Thus, waste of power due to excessive power transmission and deterioration of the secondary battery 131 caused by supply of the amount of power storage or more can be reduced. As a result, efficient and convenient power feeding can be performed for both the power feeding device K and the power receiver J.

In addition, a measure for security of identification information including specific information such as personal information is preferably performed, for example, identification information is updated every time power feeding is performed, unnecessary identification information is deleted from a power feeding device when a recognition step for power feeding is finished, or communication is encoded when identification information is transmitted.

This embodiment can be implemented in appropriate combination with the structures described in the other embodiments.

Embodiment 4

In this embodiment, another embodiment of a wireless power feeding system and a wireless power feeding method is described with reference to FIG. 9.

The power feeding system and the wireless power feeding method in this specification can be applied to a plurality of power feeding devices and power receivers. In this embodiment, an example is described in which the power feeding system and the power feeding method in any of Embodiment 1 to Embodiment 3 are applied to a plurality of power feeding devices and a plurality of power receivers. The same portions as or portions having functions similar to those in any of Embodiment 1 to Embodiment 3 are similar to those in any of Embodiment 1 to Embodiment 3 and repetitive description will be omitted. In addition, detailed description of the same portions will be omitted.

In the case that power is fed from one power feeding device to a plurality of power receivers, a frequency of a power signal transmitted so that transmission efficiency of power is optimal can be controlled with respect to each power receiver. FIG. 9 illustrates an example where power is fed to each of a plurality of power receivers Ja10a, Jb10b, and Jc10c.

The power receivers Ja10a, Jb10b, and Jc10c are placed at different distances from a power feeding device K20 and have specific resonant frequencies.

The power feeding device K20 performs power feeding by determining frequencies fb±$\Delta f_\alpha$(d(Ja)), fb±$f_\alpha$(d(Jb)), and fb±$\Delta f_\alpha$(Jc)) of power signals to be transmitted so as to obtain optimum transmission efficiency of power for the power receivers Ja10a, Jb10b, and Jc10c, respectively.

Since the power signals are transmitted to the power receivers with optimum frequencies with high power transmission efficiency, power can be supplied to the power receivers without waste.

Figure 9:
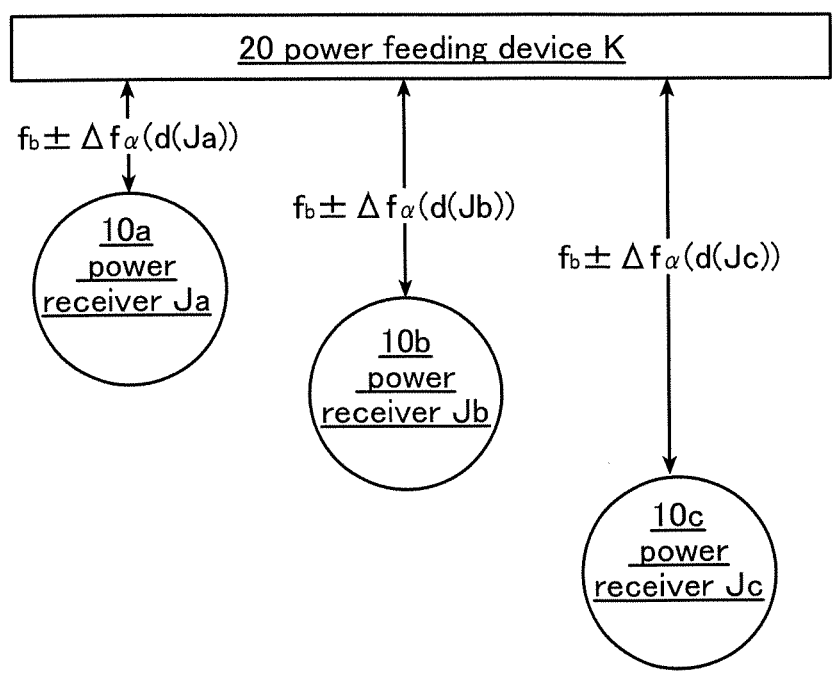
FIG. 9 illustrates an embodiment of a wireless power feeding system and a wireless power feeding method.

Although FIG. 9 illustrates a case where a single power feeding device is used, a plurality of power feeding devices may be used. Even with a plurality of power feeding devices, power feeding between the power feeding devices and power receivers can be performed by optimizing frequencies of power signals to be transmitted so as to obtain high transmission frequency.

In the case where a plurality of power receivers exit within the range in which communication with the power feeding devices can be performed, power can be transmitted only to a specific power receiver using identification information of the power receiver as described in Embodiment 3.

Since power feeding is performed by finding out identification information, a power receiver that is an object can be precisely managed, and service to a winner of a prize or the like or a subscriber can be effectively offered.

In addition, as also described in Embodiment 3, a measure for security of identification information including specific information such as personal information is preferably performed, for example, identification information is updated every time power feeding is performed, unnecessary identification information is deleted from a power feeding device when a recognition step for power feeding is finished, or communication is encoded when identification information is transmitted.

This embodiment can be implemented in appropriate combination with the structures described in the other embodiments.

This application is based on Japanese Patent Application serial no. 2010-202173 filed with Japan Patent Office on Sep. 9, 2010, the entire contents of which are hereby incorporated by reference.

What is claimed is:

1. A power feeding device comprising:
an antenna circuit;
a first oscillation circuit;
a mixer; and
a control circuit including a coupler, a determination circuit and a second oscillation circuit,
wherein the coupler is configured to detect a signal reflected from a power receiver,
wherein the determination circuit is configured to calculate a reflection coefficient from the signal detected by the coupler, and to output the reflection coefficient to the second oscillation circuit, and
wherein the mixer is configured to mix a first power signal generated by the first oscillation circuit and a second power signal generated by the second oscillation circuit and to output the mixed signal to the antenna circuit.

2. The power feeding device according to claim 1,
wherein the reflection coefficient is less than or equal to a standard reflection coefficient, or is at a minimum, and
wherein the standard reflection coefficient is less than or equal to 0.6.

3. The power feeding device according to claim 1,
wherein the antenna circuit includes a coil.

4. The power feeding device according to claim 1,
wherein the antenna circuit is configured to transmit an electromagnetic wave, and
wherein a transmission method of the electromagnetic wave is an electric field coupling method, an electromagnetic induction method, a resonance method, or a microwave method.

5. A wireless power feeding system comprising the power receiver and the power feeding device according to claim 1.

6. The wireless power feeding system according to claim 5,
wherein the power receiver includes a power receiving device portion comprising:
a power load portion;
a power storage portion configured to store power transmitted from the power feeding device, the power storage portion including a secondary battery; and
a detection portion configured to detect a voltage, a current, or a voltage and a current of the secondary battery.

7. The wireless power feeding system according to claim 6,
wherein the power receiving device portion includes a memory portion which stores identification information, and
wherein the power feeding device is configured to identify the identification information.

8. A power feeding device comprising:
a transmission/reception circuit portion configured to transmit and receive an electromagnetic wave;
a signal processing circuit portion configured to process a power signal of an electromagnetic wave that is transmitted and received by the transmission/reception circuit portion; and
a power supply portion configured to supply power to be transmitted to a power receiver,
wherein the transmission/reception circuit portion includes an antenna circuit, a rectifier circuit, a mixer, a demodulation circuit, a first oscillation circuit, and a control circuit,
wherein the antenna circuit is configured to receive a signal reflected from the power receiver,
wherein the control circuit includes a coupler, a determination circuit, a second oscillation circuit, and a third oscillation circuit,
wherein the coupler is configured to detect the signal reflected from the power receiver,
wherein the determination circuit is configured to calculate a reflection coefficient from the signal detected by the coupler, and to output the reflection coefficient to the second oscillation circuit and the third oscillation circuit, wherein the second oscillation circuit is configured to output a power signal with a frequency that changes continuously with time,
wherein the third oscillation circuit is configured to output a power signal with one determined frequency,
wherein, when the reflection coefficient is less than or equal to a standard reflection coefficient, a second power signal corresponds to the output of the third oscillation circuit and the second oscillation circuit stops,
wherein, when the reflection coefficient is larger than the standard reflection coefficient, the second power signal corresponds to the output of the second oscillation circuit and the third oscillation circuit stops, and
wherein the mixer is configured to mix a first power signal generated by the first oscillation circuit and the second power signal generated by the control circuit and to output the mixed signal to the antenna circuit.

9. The power feeding device according to claim 8,
wherein, when the reflection coefficient is the minimum reflection coefficient, the second oscillation circuit stops output and the third oscillation circuit is configured to output as the second power signal with a frequency of an absolute value of a difference between a frequency of a power signal that is the minimum reflection coefficient and a frequency of the first power signal.

10. The power feeding device according to claim 8,
wherein the standard reflection coefficient is less than or equal to 0.6.

11. The power feeding device according to claim 8,
wherein the antenna circuit includes a coil.

12. The power feeding device according to claim 8,
wherein the antenna circuit is configured to transmit an electromagnetic wave, and
wherein a transmission method of the electromagnetic wave is an electric field coupling method, an electromagnetic induction method, a resonance method, or a microwave method.

13. A wireless power feeding system comprising the power receiver and the power feeding device according to claim 8.

14. The wireless power feeding system according to claim 13,
wherein the power receiver includes a power receiving device portion comprising:
a power load portion;
a power storage portion configured to store power transmitted from the power feeding device, the power storage portion including a secondary battery; and
a detection portion configured to detect a voltage, a current, or a voltage and a current of the secondary battery.

15. The wireless power feeding system according to claim 14,
wherein the power receiving device portion includes a memory portion which stores identification information, and
wherein the signal processing circuit portion is configured to identify the identification information.

16. A wireless power feeding method comprising the steps of:
after power signals are transmitted from an antenna circuit of a power feeding device to a power receiver, calculating a proportion of signals, among the power signals output to the antenna circuit, that return from an antenna circuit of the power receiver, and outputting a reflection coefficient obtained by the calculation;
in a first case where the reflection coefficient of the power signals is less than or equal to a standard reflection coefficient, transmitting a first power signal from the antenna circuit to the power receiver, wherein the first power signal has one determined frequency;
in a second case where the reflection coefficient of the power signals is more than or equal to the standard reflection coefficient, transmitting a second power signal from the antenna circuit to the power receiver, wherein the second power signal has a frequency that changes continuously with time;
in the second case, calculating a reflection coefficient of a power signal with a frequency that changes continuously with time, and detecting a frequency of a power signal corresponding to the minimum reflection coefficient; and
in the second case, transmitting the power signal of the detected frequency from the antenna circuit to the power receiver.

17. The wireless power feeding method according to claim 16,
wherein the standard reflection coefficient is less than or equal to 0.6.

18. The wireless power feeding method according to claim 16,
wherein the power receiver detects a voltage, a current, or a voltage and a current of a secondary battery included in the power receiver, and depending on the detected information, transmits a power feeding request signal or a power reception end signal to the power feeding device.

19. The wireless power feeding method according to claim 16, further comprising the step of, before calculating the reflection coefficient, recognizing an identification information of the power receiver in the power feeding device.

20. The wireless power feeding method according to claim 16,
wherein the antenna circuit includes a coil.

21. The wireless power feeding method according to claim 16,
wherein the antenna circuit is configured to transmit an electromagnetic wave, and
wherein a transmission method of the electromagnetic wave is an electric field coupling method, an electromagnetic induction method, a resonance method, or a microwave method.

22. A power feeding device comprising:
an antenna circuit;
a first oscillation circuit;
a mixer; and
a control circuit including a coupler, a determination circuit and a second oscillation circuit,
wherein the coupler is configured to detect a signal reflected from a power receiver,
wherein the determination circuit is configured to output a reflection coefficient to the second oscillation circuit, the reflection coefficient being based on the signal detected by the coupler, and
wherein the mixer is configured to output a mixed signal to the antenna circuit, the mixed signal being generated by mixing a first power signal generated by the first oscillation circuit and a second power signal generated by the second oscillation circuit.

23. The power feeding device according to claim 22,
wherein the reflection coefficient is less than or equal to a standard reflection coefficient, or is at a minimum, and
wherein the standard reflection coefficient is less than or equal to 0.6.

24. The power feeding device according to claim 22,
wherein the antenna circuit includes a coil.

25. The power feeding device according to claim 22,
wherein the antenna circuit is configured to transmit an electromagnetic wave, and
wherein a transmission method of the electromagnetic wave is an electric field coupling method, an electromagnetic induction method, a resonance method, or a microwave method.

26. A wireless power feeding system comprising the power receiver and the power feeding device according to claim 22.

27. A power feeding device comprising:
a first oscillation circuit;
a mixer; and
a control circuit including a coupler, a determination circuit and a second oscillation circuit,
wherein the coupler is configured to detect a signal reflected from a power receiver,
wherein the determination circuit is configured to output a reflection coefficient to the second oscillation circuit, the reflection coefficient being based on the signal detected by the coupler, and
wherein the mixer is configured to output a mixed signal to an antenna circuit, the mixed signal being generated by mixing a first power signal generated by the first oscillation circuit and a second power signal generated by the second oscillation circuit.

28. The power feeding device according to claim 27,
wherein the reflection coefficient is less than or equal to a standard reflection coefficient, or is at a minimum, and
wherein the standard reflection coefficient is less than or equal to 0.6.

29. The power feeding device according to claim 27,
wherein the antenna circuit includes a coil.

30. The power feeding device according to claim 27,
wherein the antenna circuit is configured to transmit an electromagnetic wave, and
wherein a transmission method of the electromagnetic wave is an electric field coupling method, an electromagnetic induction method, a resonance method, or a microwave method.

31. A wireless power feeding system comprising the power receiver and the power feeding device according to claim 27.

* * * * *